United States Patent [19]
Hall

[11] Patent Number: 5,189,789
[45] Date of Patent: Mar. 2, 1993

[54] METHOD FOR SEALING TUBES

[75] Inventor: Charles E. Hall, West Chester, Ohio

[73] Assignee: Hall United Technologies, Inc., Int'l, West Chester, Ohio

[21] Appl. No.: 788,624

[22] Filed: Nov. 6, 1991

[51] Int. Cl.$^5$ .............................................. B23D 15/26
[52] U.S. Cl. ............................. 29/890.031; 29/402.09; 138/97
[58] Field of Search ...................... 29/840.031, 402.03, 29/402.09, 402.19, 402.21; 138/97

[56] References Cited

U.S. PATENT DOCUMENTS

| | | | |
|---|---|---|---|
| 3,900,939 | 8/1975 | Gracern | 29/447 |
| 4,723,578 | 2/1988 | Mordarski et al. | 29/447 |
| 4,754,538 | 7/1988 | Stewil, Jr. et al. | 29/890.031 |
| 4,829,660 | 5/1989 | Everett et al. | 29/890.031 |
| 4,976,307 | 12/1990 | Hall et al. | 29/447 |
| 5,101,559 | 4/1992 | Gelpi et al. | 29/890.031 |

Primary Examiner—Irene Cuda
Attorney, Agent, or Firm—Nikaido, Marmelstein, Murray & Oram

[57] ABSTRACT

A method for sealing the internal peripheral surface of a tube, such as a heat exchanger tube. A plug is provided which includes a plug body and at least one annular wing formed on an outer periphery of the plug body. The plug is chilled to a temperature below a transition temperature of the plug, then the annular wing or wings are bent backward such that the outer diameter is decreased to a diameter which is less than an inner diameter of the tube to be sealed. The chilled plug is then inserted into an open end of the tube, until a back portion of the plug is flush with the open end of the tube. As the ambient temperature heats the plugs, the plug returns to an undeformed state such that the annular wings return to a state of increased diameter, thereby sealing the tube. In order to ensure that the plug returns to this undeformed state, the plug is formed of a material having at least two allotropic states.

4 Claims, 4 Drawing Sheets

TTR < ORIGINAL

TTR > AFTER PLUNGE

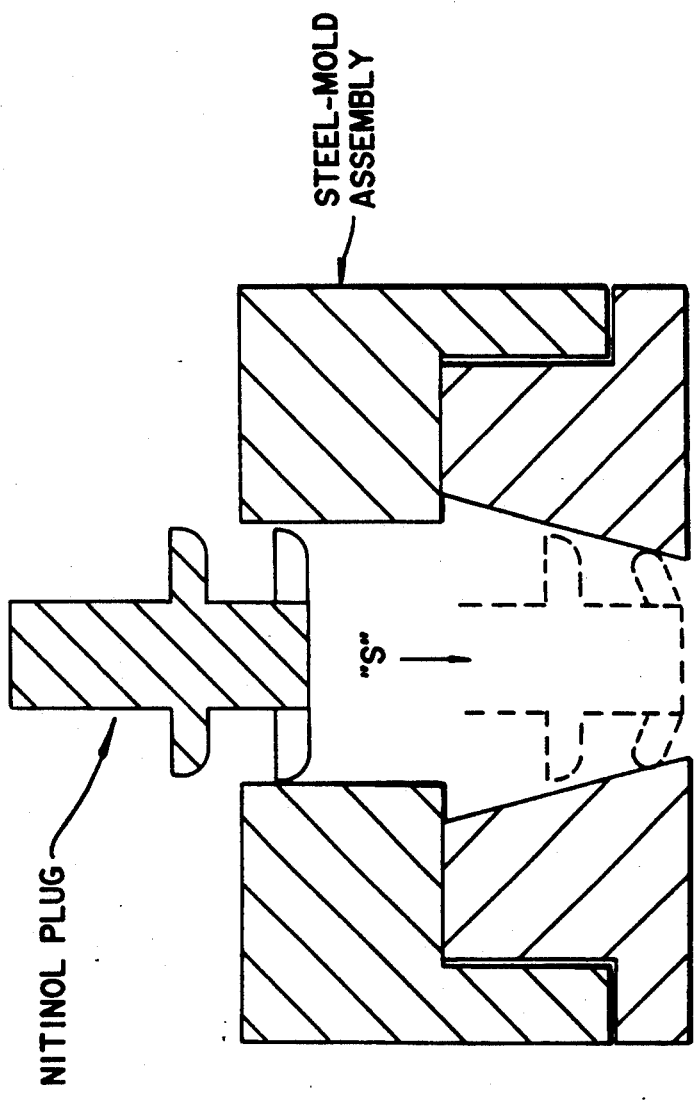

METHOD FOR SEALING TUBES

The present invention relates generally to a method and apparatus for sealing tubes that is particularly useful for sealing the ends of heat exchanger tubes. The invention, which is useful in a wide variety of heat exchangers, will be specifically disclosed in connection with a plug for a feed water heater which creates sufficient sealing force due to environmentally supplied heat working in conjunction with a metal known as a shape-memory alloy.

BACKGROUND OF THE INVENTION

The particular problems encountered in the prior art and in the industry are very well articulated in prior U.S. Pat. No. 4,976,307 which is specifically incorporated herein by reference in its entirety.

The present invention is a further improvement over the embodiments disclosed in that prior patent. As noted therein, the preferred method to return a leaking feed water heater to service is to seal both the inlet and outlet ends of the leaky U-shaped tube at the tube sheet. This is much faster and substantially more economical than replacing the entire tube or the tube bundle. Experience has shown that a feed water heater may be operated economically even when up to 10% of the tubes within the feed water heater have been plugged. If more than 10% of the tubes are plugged, the efficiency of the system declines to a level at which it is more economical to replace or repair the U-shaped tube bundles. An advantage of plugging the ends of the tubes, even when more than 10% have been plugged, is that the removal of the feed water heater from service and subsequent repair or replacement may be planned in advance and executed in an economical, orderly, non-crisis manner.

One difficulty with the plugs disclosed in the prior patent resides in use of internally or externally supplied heat. A heat source must be either provided inside or outside of the plug, which complicates the manufacturing and installation process. Additionally, once these prior art plugs are installed, it is difficult to tell when actual sealing takes place. The plug is merely inserted into a tube, and then sealed. There is no visual indication of a successful seal. Additionally, once these plugs are installed, it is very difficult to remove the plugs when further repair is done to the tube or to the tube sheets.

SUMMARY OF THE INVENTION

Accordingly, it is a primary object of the present invention to provide an improved plug which may be used to quickly and effectively seal the end of a tube of a heat exchanger.

It is another object of the invention to provide a plug which may be economically and safely stored at a plant site, and easily installed by plant personnel.

It is still a further object of the present invention to provide a plug which uses only environmental warming to expand the plug into sealing engagement with a tube of a heat exchanger. Other critical objects of the present invention are to provide a plug which can be easily removed from the tube at such a time as further repair or replacement of the tubes or tube sheet is performed. Additionally, the present invention will provide a visual indicator when successful sealing has taken place. Another equally significant advantage is that the present invention will utilize a plug which is significantly less complicated to manufacture than the prior art devices.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentality and combinations particularly pointed out in the appended claims.

To achieve the foregoing and other objects and in accordance with the purposes of the present invention as described herein, an improved device is provided for sealing the interior peripheral surface of a tube. The device includes a plug body having a means for sealing the internal peripheral surface of a tube in response to the elevation of the temperature of the sealing means above a predetermined level. The sealing means is preferably in the form of movable or bendable flanges or wings on the outer surface at points along the length of the plug. An outer portion of the plug, and in some cases the entire plug, is made of an alloy capable of at least two allotropic states, sometimes referred to as a shape-memory alloy.

In accordance with the invention, the outer movable wing portions of the plug have an outer first allotropic diameter which is slightly greater than the inner diameter of the tube to be sealed. The plug is designed such that when it is chilled to a low temperature, the movable wings or flanges can be bent slightly backward, resulting in a reduced outer allotropic diameter, such that it can be inserted into the tube to be sealed. As the environmental (ambient) temperature warms the plug, it returns to its original shape and original allotropic diameter. The movable flanges or wings are restored to their original shape by the allotropic action of the alloy. When the wings restore to their original position after insertion of the plug into the tube, the wings come into sealing contact with the internal peripheral surface of the tube.

In one embodiment, the movable wings have the appearance of ridges annularly surrounding a cylindrical portion of the plug body. The wings have a taper on the outer peripheral edge and in a vertical orientation of the plug have a slight downward bend.

Still other objects of the present invention will become apparent to those skilled in this art from the following description, wherein there is shown and described a preferred embodiment of this invention, simply by way of illustration, of one of the best modes contemplated for carrying out the invention. As will be realized, the invention is capable of other different embodiments, and its several details are capable of modification in various and obvious aspects all without departing from the invention. Accordingly, the drawings and description will be regarded as illustrative in nature and not as restrictive.

BRIEF DESCRIPTION OF THE DRAWINGS

FIG. 2 illustrates, from a side view, the insertion of a plug according to the present invention, being inserted to a mold assembly after chilling.

DETAILED DESCRIPTION OF THE PREFERRED EMBODIMENT

Figure 1:
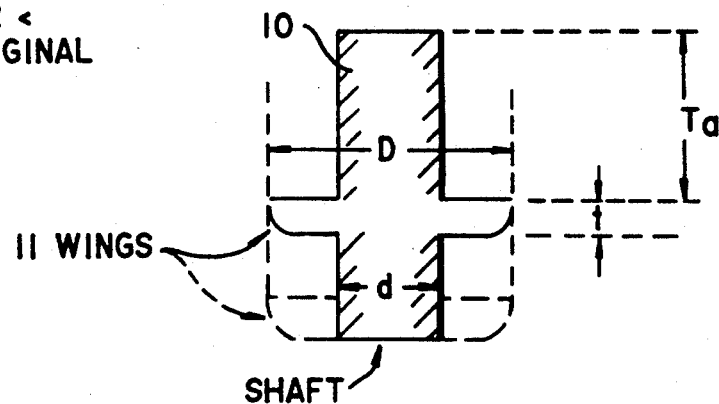
FIG. 1 illustrates a side view of a plug according to the present invention at normal environmental temperature.
Figure 1A:
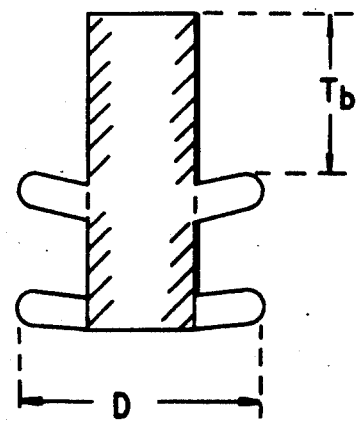
FIG. 1a illustrates the plug of FIG. 1, after it has been chilled, and the wings have been bent backwards.
Figure 3:
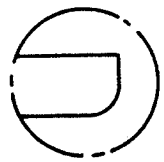
FIG. 3 illustrates an enlarged view of an end of one of the wings or flanges of the plug.

FIGS. 1 and 1a show side views of a preferred embodiment of the present invention as discussed above, which is used to seal the ends of tubes in a heat exchanger. Plug body 10 is shown with annular wings or flanges 11 disposed thereupon. Two wings are shown; however, one or more wings can be used.

Wings 11 have a thickness t, and an outer diameter D. The plug body 10 has an outer diameter d. The edges of wings t are tapered as shown, so that when the wings are bent back, the surface area contacting an inner diameter of a tube is maximized.

FIG. 1a is the same as FIG. 1, after the wings have been bent backward, in preparation of sealing a tube. The allotropic alloy is configured so that it has a low transition temperature, such as 0° C. Therefore, if the allotropic alloy is chilled to below this transition temperature, then the alloy is bent or deformed, the alloy will return to its unbent or deformed state after the temperature of the plug rises above this transition temperature. Therefore, in FIG. 1a, the plug has been chilled to a temperature below a transition temperature, and the movable wings have been bent rearward by forcing the plug through a steel mold assembly, as shown in FIG. 2. The steel mold assembly has a tapered portion as shown, which is slightly less than the inner diameter of a heat exchange tube to be plugged. The plug is then pushed all the way through this tapered portion, resulting in the bent back shape of the wings as shown in FIG. 1a.

An allotropic alloy which meets the requirements of this invention is NITINOL; NITINOL is a marmem alloy, which is well suited for the invention because the transition temperature can be modified during the manufacturing of the alloy, and the alloy becomes malleable when chilled.

NITINOL, and other allotropic alloys, are well known in the art, and a person of ordinary skill in the art would be able to manufacture a metal which has the properties required to function as a plug according to this invention.

Figure 4:
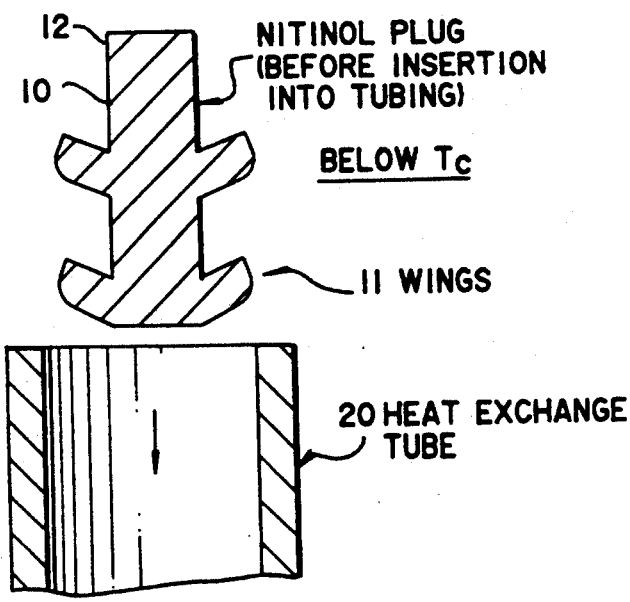
FIG. 4 illustrates a side view of a chilled and formed plug being inserted into a heat exchange tube.
Figure 5:
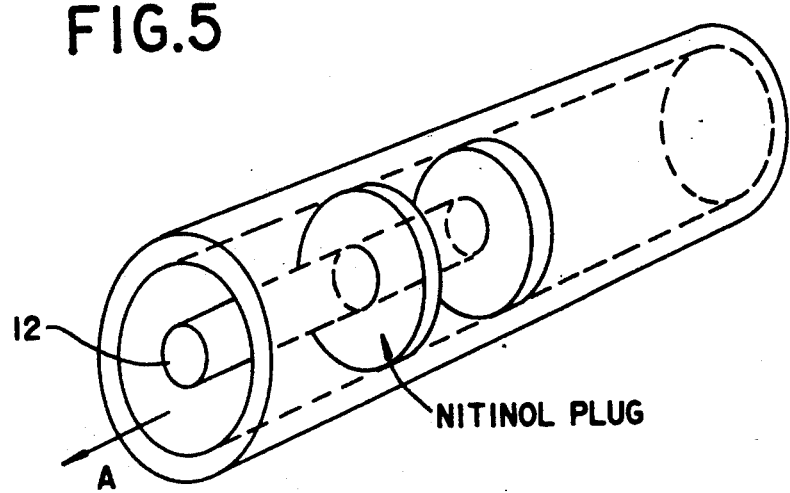
FIG. 5 illustrates a plug according to the present invention after insertion into a heat exchange tube, and after the plug has returned to its original diameter.

FIGS. 4 and 5 illustrate a plug according to the present invention being used to seal a heat exchange tube. Wings 11 on plug body 10 are provided with an unbent, original diameter, D (see FIG. 1) which is slightly larger than the inner diameter of heat exchange tube 20. The NITINOL plug is then chilled to below the transition temperature, and wings 11 are bent backwards by pushing the plugs through a steel mold assembly, as shown in FIG. 2. The chilled, bent plug is then inserted into heat exchange tube 20, until end 12 of plug body 10 is flush with the end of the heat exchange tube (see FIG. 5). As the plug heats back up to the environmental temperature by ambient heating, the alloy will return to the first, unbent, allotropic state. This will increase the diameter of wings 11 back to outer diameter D which will forcibly press the outer periphery of wings 11 against the inner periphery of heat exchange tube 20. Because of this straightening effect, end 12 of plug body 10 will move outward, in the direction of arrow A on FIG. 5. This will provide a visual indicator that the wings have returned to their unbent allotropic state, and therefore have sealed the plug.

This invention is not limited to plugs having two or more wings. This invention is intended to also include embodiments which have only one wing thereupon. A distinct advantage exists in having two or more wings, in that the second wing will provide a self-aligning effect, and prevent the plug from assuming a position which is oblique to the inner periphery of the tube, as well as enhancing the sealability of the plug.

Figures 6, 6A:
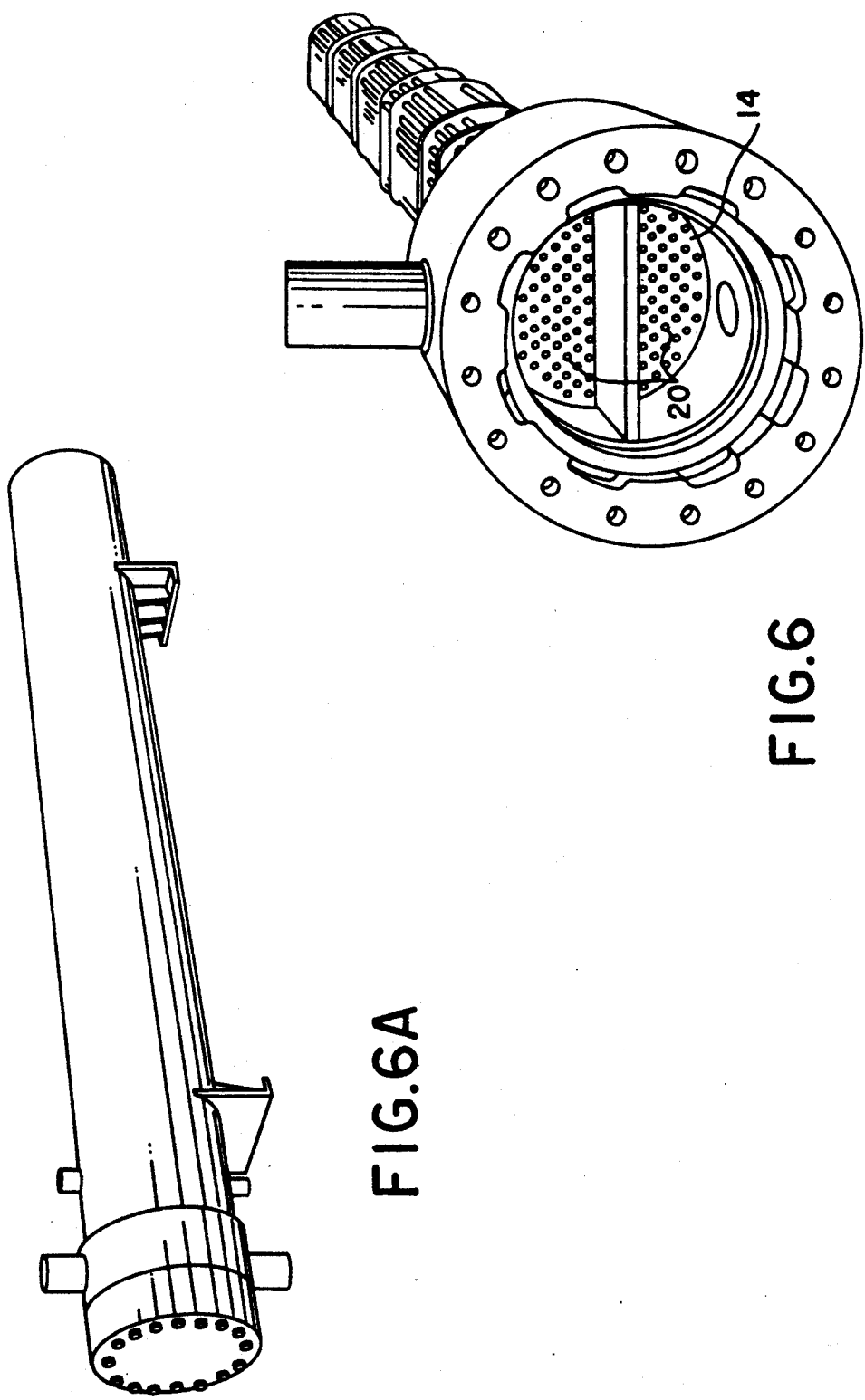
FIGS. 6 and 6A illustrate perspective views of a heat exchanger, showing tubes which can be plugged using the invention.

The plugs can be configured in such a way as to expand the overall diameter of the heat exchange tube; this has a distinct advantage in that if a plug is placed close to where the heat exchange tube is attached to the "tube sheet" 14 (see FIG. 6), sealing between the heat exchange tube and the tube sheet will be improved.

Wings 11 are formed and bent such that there is a clearance on the order of thousandths of an inch between the outer diameter of wings 11 and the inner diameter of heat exchange tube 20. This will ensure that strong sealing will take place.

The insertion and removal of a plug according to this invention will now be described:

After a leaking tube in a heat exchanger is identified, the exchanger is disassembled to the point where access can be gained to the entrance to the leaking heat exchange tube. A plug according to the present invention is then selected such that the unbent diameter of wings 11 at room temperature is slightly greater than the inner diameter of the heat exchange tube. The plug is then chilled in a chilling bath, which may be a mixture of dry ice and alcohol, to a temperature of −20° to −30° C. Other methods of chilling can also be used. This is an ideal chilling temperature for a plug which has a transition temperature of 0°. As indicated above, the transition temperatures can be adjusted during the manufacturing of the plug. After chilling, the plug is then pushed through a mold assembly, similar to that shown in FIG. 2. The mold assembly bends the wings back such that the outer diameter of wings 11 is slightly smaller than the inner diameter of the heat exchange tube to be sealed. The plug body is then inserted into the end of the tube, until end 12 of plug body 10 is flush with the end of the tube. The plug is then allowed to return to the environmental temperature by ambient heating, which will then bring the plug past the transition temperature, allowing it to return to its first, unbent, allotropic state. This will result in the diameter of the wings going back to large diameter D thereby sealing the pipe and moving end 12 of plug body 10 out past the end of the tube. The heat exchanger assembly can then be assembled and immediately put back into use.

At some later point, it may be useful to remove an installed plug from a tube. Prior art methods of accomplishing this, on prior art plugs, included boring or drilling to remove the plug. This is an expensive and time consuming operation. Using a plug of the claimed invention, removal can be easily affected by reversing the steps of installation. The heat exchanger assembly must be disassembled so that access can be gained to the tube sheet and the tubes having the plugs contained therein. The area of the tube containing the plug is then chilled in a chilling bath as described earlier, or locally chilled by spraying or similar method, thereby returning the temperature of the plugs to −20° or −30° C. As indicated earlier, this will allow the alloy to become soften such that it can be pulled out of the tube easily and quickly. No boring or drilling is required.

The foregoing description of a preferred embodiment of the invention has been presented for purposes of illustration and description. It is not intended to be exhaustive or to limit the invention to the precise form disclosed. For example, while the invention is specifically disclosed in the context of a feed water heater, it could be employed in any number of heat exchangers or other devices where it might be desirable to plug the tube ends. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for sealing the internal peripheral surface of a tube, comprising the steps of:
    providing a plug which includes a plug body and means for sealing the internal peripheral surface of the tube in response to temperature elevation above an insertion level, with said means comprising at least one annular wing formed on an outer periphery of the plug body;
    chilling said plug to a temperature below a transition temperature of said plug;
    bending said at least one annular wing of said chilled plug backward such that said at least one wing has an outer diameter which is less than an inner diameter of a tube to be sealed;
    inserting said chilled plug with said at least one bent wing into an open end of a tube, such that a back portion of said plug is flush with the open end of said tube; and
    heating said plug by exposure to ambient temperature,
    wherein said plug is formed of a material which will return to an un-deformed state after being heated past said transition temperature, such that said annular wings return to a state of increased diameter, thereby sealing the tube.

2. A method for sealing as recited in claim 1, wherein said plug is made of an alloy having at least two allotropic states.

3. A method for sealing as recited in claim 1, wherein said plug includes sealing means which comprise at least two annular wings formed on the outer periphery of the plug body.

4. A method for sealing as recited in claim 1, wherein said step of bending said at least one annular wing is performed by inserting said plug through a tapered orifice having a large diameter end and a small diameter end, said small diameter and having a diameter which is less than the inner diameter of the tube to be sealed.

* * * * *